(12) United States Patent
Fujimoto et al.

(10) Patent No.: US 10,280,323 B2
(45) Date of Patent: May 7, 2019

(54) AQUEOUS INK, INK CARTRIDGE AND INK JET RECORDING METHOD

(71) Applicant: CANON KABUSHIKI KAISHA, Tokyo (JP)

(72) Inventors: Kuniaki Fujimoto, Chofu (JP); Kenji Moribe, Fujisawa (JP); Kenichi Shiiba, Warabi (JP); Yuki Nishino, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/912,813

(22) Filed: Mar. 6, 2018

(65) Prior Publication Data
US 2018/0258299 A1    Sep. 13, 2018

(30) Foreign Application Priority Data

Mar. 10, 2017  (JP) ................................ 2017-045717

(51) Int. Cl.
| | | |
|---|---|---|
| *C09D 11/38* | (2014.01) | |
| *C09D 11/322* | (2014.01) | |
| *C09D 11/324* | (2014.01) | |
| *B41J 2/175* | (2006.01) | |

(52) U.S. Cl.
CPC .......... *C09D 11/322* (2013.01); *C09D 11/324* (2013.01); *C09D 11/38* (2013.01); *B41J 2/17503* (2013.01)

(58) Field of Classification Search
CPC .............................. C09D 11/30; C09D 11/322
See application file for complete search history.

(56) References Cited

U.S. PATENT DOCUMENTS

| | | | |
|---|---|---|---|
| 6,332,919 B2 * | 12/2001 | Osumi ...................... | B41J 2/01 106/31.6 |
| 7,276,112 B2 | 10/2007 | Tokuda et al. | |
| 7,699,924 B2 | 4/2010 | Mafune et al. | |
| 8,684,509 B2 | 4/2014 | Yamasaki et al. | |
| 8,690,307 B2 | 4/2014 | Okumura et al. | |
| 9,238,741 B2 | 1/2016 | Moribe et al. | |
| 9,243,155 B2 | 1/2016 | Okamura et al. | |
| 2005/0274281 A1 * | 12/2005 | Jackson ................. | C09D 11/30 106/31.43 |

(Continued)

FOREIGN PATENT DOCUMENTS

| | | |
|---|---|---|
| JP | 2006-045514 A | 2/2006 |
| JP | 2012-214713 A | 11/2012 |

(Continued)

*Primary Examiner* — Veronica F Faison
(74) *Attorney, Agent, or Firm* — Venable LLP

(57) ABSTRACT

Provided is an aqueous ink that enables the recording of images having high optical density and excellent toughness and has excellent reliability. An aqueous ink for ink jet includes a pigment, a resin having an anionic group, a salt and a water-soluble organic solvent. The pigment is a self-dispersible pigment in which an anionic group is bonded to the particle surface of carbon black directly or through another atomic group, the resin has a weight-average molecular weight of 20,000 or less, the water-soluble organic solvent includes glycerol and an additional solvent other than glycerol, and the content (% by mass) of the additional solvent relative to the content (% by mass) of glycerol in terms of mass ratio is 0.6 times or less.

15 Claims, 2 Drawing Sheets

(56) References Cited

U.S. PATENT DOCUMENTS

| | | | |
|---|---|---|---|
| 2009/0020037 A1* | 1/2009 | Jackson | C09D 11/322 106/31.78 |
| 2014/0015895 A1 | 1/2014 | Okamura et al. | |
| 2014/0168314 A1 | 6/2014 | Moribe et al. | |
| 2017/0107387 A1 | 4/2017 | Fujimoto et al. | |

FOREIGN PATENT DOCUMENTS

| | | |
|---|---|---|
| JP | 2013-253230 A | 12/2013 |
| JP | 2016-044236 A | 4/2016 |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, aqueous inks for ink jet are required to have such characteristics as to enable the recording of high quality images, for example, having high optical density and images having excellent toughness including abrasion resistance and highlighter resistance. Such inks are also required to have excellent reliability including ejection stability and ejection accuracy.

To meet the above requirements, various techniques have been disclosed. For example, in order to record images having high optical density and excellent abrasion resistance, an aqueous ink including what is called a self-dispersible pigment, a water-soluble organic solvent containing a good solvent and a poor solvent for the pigment at a certain ratio and a resin has been disclosed (Japanese Patent Application Laid-Open No. 2006-045514). In addition, an aqueous ink for ink jet including a self-dispersible pigment, a resin and a salt and enabling the recording of images satisfying both the optical density and the toughness (abrasion resistance, highlighter resistance) has been disclosed (Japanese Patent Application Laid-Open No. 2012-214713, Japanese Patent Application Laid-Open No. 2013-253230, Japanese Patent Application Laid-Open No. 2016-044236).

By using the aqueous ink disclosed in Japanese Patent Application Laid-Open No. 2006-045514, Japanese Patent Application Laid-Open No. 2012-214713, Japanese Patent Application Laid-Open No. 2013-253230 or Japanese Patent Application Laid-Open No. 2016-044236, images having high optical density and excellent toughness can be recorded. The result of studies by the present inventors, however, has revealed that irregular ejection may be caused after ejection of such an aqueous ink for a long time with an ink jet recording apparatus, and the irregular ejection is caused more frequently as the number of recording times increases.

SUMMARY OF THE INVENTION

The present invention is intended to provide an aqueous ink that enables the recording of images having high optical density and excellent toughness and has excellent reliability. The present invention is also intended to provide an ink cartridge including the aqueous ink and an ink jet recording method.

The above objects are achieved by the following present invention. In other words, the present invention provides an aqueous ink for ink jet including a pigment, a resin having an anionic group, a salt and a water-soluble organic solvent. The pigment is a self-dispersible pigment in which an anionic group is bonded to a particle surface of carbon black directly or through an another atomic group, the resin has a weight-average molecular weight of 20,000 or less, the salt is a salt formed by bonding at least one cation selected from the group consisting of an alkali metal ion, an ammonium ion and an organic ammonium ion with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$, the water-soluble organic solvent includes glycerol and an additional solvent other than the glycerol, and a content (% by mass) of the additional solvent relative to a content (% by mass) of the glycerol in terms of mass ratio is 0.6 times or less.

Further features of the present invention will become apparent from the following description of exemplary embodiments with reference to the attached drawings.

DESCRIPTION OF THE EMBODIMENTS

Figure 1:
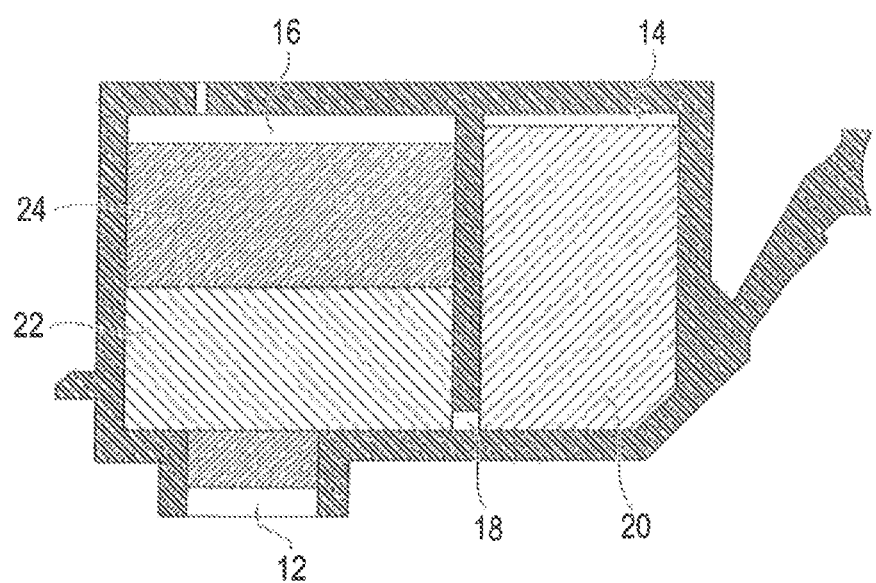
FIG. 1 is a schematic sectional view showing an ink cartridge pertaining to an embodiment of the present invention.

The present invention will now be described in detail with reference to preferred embodiments. In the present invention, when a compound is a salt, the salt dissociates into ions in an ink, but such a case is expressed as "containing a salt" for convenience. An aqueous ink for ink jet may be simply called "ink". Physical property values are values determined at normal temperature (25° C.) unless otherwise noted.

As the result of studies, the inventors of the present invention have ascertained that when an aqueous ink containing a self-dispersible type carbon black (hereinafter also called self-dispersible pigment), a resin having an anionic group and a salt is used, various image characteristics can be improved. For example, when an ink containing the salt but containing a resin-dispersed pigment in place of the self-dispersible pigment is used, it is difficult to record images having higher toughness (highlighter resistance on plain paper or abrasion resistance on glossy paper) or to record images having higher optical density. When an ink containing the self-dispersible pigment and the salt but containing no resin having an anionic group is used, it is difficult to record images having higher toughness. When an ink containing the self-dispersible pigment and the resin having an anionic group but containing no salt is used, it is difficult to record images having higher optical density. From these reasons, the ink in the present invention contains, as ink constitution components, a self-dispersible pigment, a resin having an anionic group and a salt.

However, it has been revealed that irregular ejection is caused when the aqueous ink is ejected for a long time with an ink jet recording apparatus, and the irregular ejection is caused more frequently as the number of recording times increases. The inventors of the present invention have specifically studied the reason. As a result, it has revealed that aggregation substances are generated in an ink flow path in the recording head that causes irregular ejection. From the analysis of the aggregation substances and the examination result for the cause of the irregular ejection, the inventors of the present invention suggest the following mechanism for the cause of the irregular ejection.

Water in an aqueous ink filled in an ink flow path in a recording head easily evaporates from ejection orifices. When water evaporates from an ink containing a self-dispersible pigment, a resin having an anionic group and a salt, the salt concentration and the resin concentration increase as the water content decreases. As the salt concentration and the resin concentration increase, the electrolyte content increases, and the electric double layer of the self-dispersible pigment is compressed. Due to the compression of the electric double layer, the hydrophobic surfaces of carbon black come close to each other, and the carbon black aggregates to generate aggregation substances. When an aqueous ink is ejected for a long time and the number of recording times increases, both the generation rate of aggregation substances and the adhesion rate of generated aggregation substances to an ink flow path increase, and thus the irregular ejection is likely to be caused.

In contrast, when an ink containing two of the self-dispersible pigment, the resin having an anionic group and the salt is used, no aggregation substance is generated. For example, in an ink containing a resin-dispersed pigment in place of the self-dispersible pigment, the electric double layer is unlikely to be compressed, and thus carbon black does not aggregate even when water evaporates. In an ink not containing at least one of the resin having an anionic group and the salt, the electrolyte content is unlikely to increase to such a degree as to cause the compression of an electric double layer even when water evaporates, and thus no aggregation of carbon black is also caused.

As the result of further studies, it has been found that when the following requirements (1) to (5) are satisfied, an aqueous ink for ink jet that enables the recording of images having high optical density and excellent toughness and causes a suppression of irregular ejection after ejection of the ink for a long time can be produced.

(1) Containing a pigment, a resin having an anionic group, a salt and a water-soluble organic solvent.
(2) The pigment is a self-dispersible pigment in which an anionic group is bonded to the particle surface of carbon black directly or through another atomic group.
(3) The resin has a weight-average molecular weight of 20,000 or less.
(4) The salt is a salt formed by bonding a particular monovalent cation such as an alkali metal ion with an anion such as $Cl^-$.
(5) The water-soluble organic solvent includes glycerol and an additional solvent other than the glycerol, and the content (% by mass) of the additional solvent relative to the content (% by mass) of the glycerol in terms of mass ratio is 0.6 times or less.

The resin is required to have a weight-average molecular weight of 20,000 or less. When a resin has a weight-average molecular weight of more than 20,000, irregular ejection is caused after ejection of the ink for a long time. A resin having a weight-average molecular weight of more than 20,000 is likely to have high hydrophobicity, and thus the resin is likely to adsorb together to cause aggregation. In addition, a self-dispersible pigment also adsorbs to the resin to cause aggregation, and thus the formation of aggregation substances is supposed to be accelerated.

The reason why the irregular ejection is suppressed after ejection of the ink for a long time when the content (% by mass) of the additional solvent relative to the content (% by mass) of the glycerol in terms of mass ratio is 0.6 times or less is supposed as follows. In other words, it is supposed that by adjusting the mass ratio to 0.6 times or less, glycerol is likely to be present among a self-dispersible pigment, a resin and a salt even when the electric double layer of the self-dispersible pigment is compressed by the resin or the salt, and the aggregation is relaxed.

<Ink>

The ink pertaining to an embodiment of the present invention is an aqueous ink for ink jet containing a pigment, a resin having an anionic group, a salt and a water-soluble organic solvent. Components contained in the ink pertaining to an embodiment of the present invention and the like will next be described in detail.

(Pigment)

The pigment used in the ink is a self-dispersible pigment in which an anionic group is bonded to the particle surface of carbon black directly or through another atomic group (—R—). By using such a self-dispersible pigment, a dispersant for dispersing carbon black in an ink is not required to be added, or the amount of such a dispersant can be reduced. After applied to a recording medium, an ink containing a self-dispersible pigment is likely to change in state, including viscosity increase and pigment association or aggregation, due to evaporation of water or the like. Hence, when an ink containing a self-dispersible pigment is used, images having high optical density can be recorded.

As the carbon black, for example, any carbon black including furnace black, lamp black, acetylene black and channel black can be used.

The anionic group may be dissociated partly or completely in an ink. Examples of the anionic group include anionic groups such as a carboxylic acid group, a sulfonic acid group, a phosphoric acid group and a phosphonic acid group. Of them, a carboxylic acid group is preferred. The self-dispersible pigment may have two types of anionic groups but preferably has a single type of anionic group.

Examples of the counter ion of the anionic group include cations such as a proton, an alkali metal cation, an ammonium cation and an organic ammonium cation. Of them, the counter ion is preferably a cation of an alkali metal such as lithium, sodium and potassium because the ink ejection stability is improved as compared with, for example, an ammonium cation or an organic ammonium cation. Specifically, the counter ion is particularly preferably a potassium ion.

The anionic group may be bonded to the particle surface of carbon black through another atomic group (—R—). Examples of the another atomic group (—R—) include an alkylene group, an arylene group, an amide group, a sulphonyl group, an imino group, a carbonyl group, an ester group, an ether group and combination groups thereof. In the present invention, a self-dispersible pigment in which an anionic group is bonded to the particle surface of carbon black through another atomic group is preferred, and in this case, the anionic group is preferably a carboxylic acid group.

In the ink, the content (% by mass) of the self-dispersible pigment is preferably 2.00% by mass or more to 4.00% by mass or less. When the content of the self-dispersible pigment is less than 2.00% by mass, the effect of improving the optical density of images recorded may be slightly reduced. When the content of the self-dispersible pigment is more than 4.00% by mass, the effect of suppressing the irregular ejection caused after ejection of the ink for a long time may be slightly reduced.

(Resin)

The ink contains a resin having an anionic group. Examples of the anionic group include a carboxylic acid group, a sulfonic acid group, a phosphoric acid group and a phosphonic acid group. Of them, a carboxylic acid group is preferred. A water-soluble resin is preferably used.

The resin has a weight-average molecular weight of 20,000 or less that is determined by gel permeation chromatography (GPC) in terms of polystyrene. The resin preferably has a weight-average molecular weight of 8,000 or more. When a urethane resin has a weight-average molecular weight of less than 8,000, images recorded on plain paper may have a slightly lower highlighter resistance. When an acrylic resin has a weight-average molecular weight of less than 8,000, images recorded on glossy paper may have a slightly lower abrasion resistance.

Whether a resin is "water-soluble" or "water-dispersible" can be determined by the following procedure. First, a liquid containing a resin (resin solid content: 10% by mass) neutralized with an alkali (such as sodium hydroxide and potassium hydroxide) in an amount corresponding to the acid value is prepared. Next, the prepared liquid is diluted 10-fold (in terms of volume) with pure water to prepare a sample solution. The particle diameter of the resin in the sample solution is then determined by dynamic light scattering. When particles having particle diameters are observed, such a resin can be determined to be "water-dispersible". When particles having particle diameters are not observed, such a resin can be determined to be "water-soluble". The conditions for the measurement can be as follows, for example: SetZero: 30 seconds; number of measurement times: 3; measurement time: 180 seconds; shape: spherical; and refractive index: 1.59. As the particle size distribution analyzer, a particle size analyzer (for example, trade name "Nanotrac UPA-EX150", manufactured by NIKKISO CO., LTD.) by dynamic light scattering can be used, for example. Needless to say, the particle size distribution analyzer, the measurement conditions and the like are not limited to the above.

The resin preferably has an acid value of 60 mgKOH/g or more to 130 mgKOH/g or less. When a resin having an acid value of less than 60 mgKOH/g is used to record images with an ink jet recording apparatus, the ejection stability may slightly deteriorate. For example, adhesion positions of ink droplets are likely to be displaced, or ink drops are unlikely to be appropriately formed to achieve a predetermined ejection amount. When a resin has an acid value of more than 130 mgKOH/g, the effect of suppressing the irregular ejection caused after ejection of the ink for a long time may be slightly reduced.

In the ink, the content (% by mass) of the resin is preferably 0.50% by mass or more to 1.60% by mass or less based on the total mass of the ink. When the content of the resin is less than 0.50% by mass, a smaller amount of the resin is left on a formed pigment layer, and thus the effect of improving the highlighter resistance of images recorded on plain paper or the effect of improving the abrasion resistance of images recorded on glossy paper may be slightly reduced. When the content of the resin is more than 1.60% by mass, the aggregation of carbon black is likely to be accelerated due to the evaporation of water or the like, and thus the effect of suppressing the irregular ejection caused after ejection of the ink for a long time may be slightly reduced.

In the ink, the content (% by mass) of the self-dispersible pigment relative to the content (% by mass) of the resin in terms of mass ratio is preferably 2.5 times or more to 4.0 times or less. When the mass ratio is less than 2.5 times, the amount of the resin is excessive relative to the amount of the self-dispersible pigment, and the aggregation of carbon black is likely to be accelerated due to the evaporation of water or the like. Accordingly, the effect of suppressing the irregular ejection caused after ejection of the ink for a long time may be slightly reduced. When the mass ratio is more than 4.0 times, a smaller amount of the resin is left on a formed pigment layer, and thus the effect of improving the highlighter resistance of images recorded on plain paper or the effect of improving the abrasion resistance of images recorded on glossy paper may be slightly reduced.

Specific examples of the resin include acrylic resins, polyester resins, urethane resins and urea resins. These resins can be used singly or in combination of two or more of them. Specifically, both the acrylic resin and the urethane resin are particularly preferably contained in the ink. The urethane resin is effective in improving the highlighter resistance of images recorded on plain paper, whereas the acrylic resin is effective in improving the abrasion resistance of images recorded on glossy paper. On this account, an ink containing both the resins enables the recording of images having satisfactory toughness on various recording media and thus is preferred.

[Acrylic Resin]

The acrylic resin is preferably a copolymer having a hydrophilic unit and a hydrophobic unit as constitutional units. The acrylic resin is preferably water soluble. The "water-soluble acrylic resin" means a resin that can be dissolved in an aqueous medium as a mixed solvent of water and a water-soluble organic solvent and can be present in an aqueous medium in the form with no particle diameter when subjected to dynamic light scattering. In the below description, "(meth)acrylic" means "acrylic" and "methacrylic", and "(meth)acrylate" means "acrylate" and "methacrylate".

The hydrophilic unit is a unit formed by polymerization of a monomer having a hydrophilic group such as an acid group, a hydroxy group and an ethylene oxide group. Examples of the monomer having a hydrophilic group include acidic monomers having a carboxylic acid group, such as (meth)acrylic acid, itaconic acid, maleic acid and fumaric acid; acidic monomers having a phosphonic acid group, such as (meth)acrylic acid-2-ethyl phosphonate; anionic monomers including anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy(mono, di, tri, poly)ethylene glycol (meth)acrylates. Examples of the cation constituting a salt of an anionic monomer include a lithium ion, a sodium ion, a potassium ion, an ammonium ion and organic ammonium ions. Examples of the cation constituting a salt of an anionic group include a lithium cation, a sodium cation, a potassium cation, an ammonium cation and organic ammonium cations. Specifically preferred is a resin containing potassium as a cation.

The hydrophobic unit is a unit formed by polymerization of a monomer having no hydrophilic group such as an acid group, a hydroxy group and an ethylene oxide group. Examples of the monomer having no hydrophilic group include monomers having an aromatic ring, such as styrene, α-methylstyrene and benzyl (meth)acrylate; and monomers having an aliphatic group, such as ethyl (meth)acrylate, methyl (meth)acrylate, (n-, iso-)propyl (meth)acrylates, (n-, iso-, t-)butyl (meth)acrylates and 2-ethylhexyl (meth)acrylate.

The acrylic resin is particularly preferably a copolymer having a hydrophilic unit derived from a monomer having a carboxylic acid group and a hydrophobic unit derived from a monomer having an aromatic ring or a monomer having an aliphatic group.

[Urethane Resin]

As the urethane resin, for example, a urethane resin having a unit derived from a polyisocyanate, a polyol having no acid group, a polyol having an acid group, a polyamine or the like can be used. The urethane resin is preferably water soluble. The "water-soluble urethane resin" means a resin that can be dissolved in an aqueous medium as a mixed solvent of water and a water-soluble organic solvent and can be present in an aqueous medium in the form with no particle diameter when subjected to dynamic light scattering.

[Polyisocyanate]

A polyisocyanate is the compound having two or more isocyanate groups in the molecular structure thereof. Examples of the polyisocyanate include aliphatic polyisocyanates and aromatic polyisocyanates. The proportion of the unit derived from a polyisocyanate relative to the urethane resin (% by mole) is preferably 10.0% by mole or more to 80.0% by mole or less and more preferably 20.0% by mole or more to 60.0% by mole or less. The proportion of the unit derived from a polyisocyanate relative to the urethane resin (% by mass) is preferably 10.0% by mass or more to 80.0% by mass or less.

Examples of the aliphatic polyisocyanate include polyisocyanates having a chain structure, such as tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate and 3-methylpentane-1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate and 1,3-bis(isocyanate methyl) cyclohexane.

Examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate and α,α,α',α'-tetramethylxylylene diisocyanate. Of these polyisocyanates, a polyisocyanate having a cyclic structure is preferably used. Of the polyisocyanates having a cyclic structure, isophorone diisocyanate is more preferably used.

[Polyol, Polyamine]

A polyol is the compound having two or more hydroxy groups in the molecular structure thereof. Examples of the polyol include polyols having no acid group, such as polyether polyols, polyester polyols and polycarbonate polyols; and polyols having an acid group. A polyamine is the compound having two or more "amino groups or imino groups" in the molecular structure thereof. The proportion of the units derived from a polyol and a polyamine (% by mole) relative to the urethane resin is preferably 10.0% by mole or more to 80.0% by mole or less and more preferably 20.0% by mole or more to 60.0% by mole or less.

[Polyol Having No Acid Group]

Examples of the polyether polyol include addition polymers of an alkylene oxide and a polyol; and glycols such as (poly)alkylene glycols. Examples of the alkylene oxide include ethylene oxide, propylene oxide, butylene oxide and α-olefin oxides. Examples of the polyol to be subjected to addition polymerization with an alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea and derivatives thereof: and triols such as glycerol, trimethylolpropane, 1,2,5-hexanetriol, 1,2,6-hexanetriol, pentaerythritol, trimethylolmelamine and derivatives thereof and polyoxypropylene triol. Examples of the glycol include (poly)alkylene glycols such as tetramethylene glycol, hexamethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol and neopentyl glycol; and ethylene glycol-propylene glycol copolymers.

Examples of the polyester polyol include acid esters. Examples of the acid component constituting the acid esters include aromatic dicarboxylic acids such as phthalic acid, naphthalenedicarboxylic acid, biphenyldicarboxylic acid and tetrahydrophthalic acid; alicyclic dicarboxylic acids such as hydrogenated products of these aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkylsuccinic acids, linoleic acid, maleic acid, fumaric acid, mesaconic acid, citraconic acid and itaconic acid. Anhydrides, salts and derivatives (including alkyl esters and acid halides) thereof are also usable as the acid component, for example. Examples of the component to form an ester with the acid component include polyols such as diols and triols; and glycols such as (poly)alkylene glycols. Examples of the polyols and the glycols include those exemplified as the components constituting the above polyether polyol.

As the polycarbonate polyol, a polycarbonate polyol produced by a known method can be used. Specific examples include alkane diol-type polycarbonate diols such as polyhexamethylene carbonate diol. Other examples include polycarbonate diols prepared by reacting a carbonate component such as alkylene carbonates, diaryl carbonates and dialkyl carbonates or phosgene with an aliphatic diol component.

In the urethane resin, the proportion of the unit derived from a polyol having no acid group (% by mole) relative to the total amount of the unit derived from a polyol is preferably within the following range. In other words, the proportion is preferably 5.0% by mole or more to 50.0% by mole or less and more preferably 10.0% by mole or more to 30.0% by mole or less. In the urethane resin, the proportion of the unit derived from a polyol having no acid group (% by mass) is preferably 5.0% by mass or more to 60.0% by mass or less.

As the polyol, a polypropylene glycol is preferably used. In other words, a urethane resin having the unit derived from a polypropylene glycol is preferably used.

[Polyol Having an Acid Group]

Examples of the polyol having an acid group include polyols having an acid group such as a carboxylic acid group, a sulfonic acid group, a phosphoric acid group and a phosphonic acid group. The acid group is preferably a carboxylic acid group. Examples of the polyol having a carboxylic acid group include dimethylolacetic acid, dimethylolpropionic acid, dimethylolbutanoic acid and dimethylolbutyric acid. Of them, dimethylolpropionic acid and dimethylolbutanoic acid are preferred.

The acid group of the polyol having an acid group may be in a salt form. Examples of the cation forming a salt include ions of alkali metals such as lithium, sodium and potassium, an ammonium ion and cations of organic amines such as dimethylamine. Specifically preferred is a resin containing potassium ion as a cation. The molecular weight of a general-purpose polyol having an acid group is at most about 400, and thus the unit derived from a polyol having an acid group basically constitutes a hard segment of a urethane resin. The acid value of the urethane resin can be controlled by the amount of a polyol having an acid group.

In the urethane resin, the proportion of the unit derived from a polyol having an acid group (% by mole) relative to the total amount of the unit derived from a polyol is preferably within the following range. In other words, the proportion is preferably 30.0% by mole or more to 90.0% by mole or less and more preferably 50.0% by mole or more to 90.0% by mole or less.

[Polyamine]

Examples of the polyamine include monoamines having a plurality of hydroxy groups, such as dimethylolethylamine, diethanolmethylamine, dipropanolethylamine and dibutanolmethylamine; bifunctional polyamines such as ethylenediamine, propylenediamine, hexylenediamine, isophoronediamine, xylylenediamine, diphenylmethanediamine, hydrogenated diphenylmethane diamine and hydrazine; and three or more functional polyamines such as diethylenetriamine, triethylenetetramine, tetraethylenepentamine, polyamide polyamine and polyethylene polyimine. For convenience, compounds having a plurality of hydroxy groups and a single "amino group or imino group" are also exemplified as the "polyamine". The molecular weight of a polyamine is at most about 400, and thus the unit derived from a polyamine basically constitutes a hard segment of a urethane resin. The proportion of the unit derived from a polyamine (% by mole) relative to the urethane resin is preferably 10.0% by mole or less and more preferably 5.0% by mole or less. The proportion of the unit derived from a polyamine (% by mole) relative to the urethane resin may be 0.0% by mole.

[Crosslinking Agent, Chain Extender]

To synthesize the urethane resin, a crosslinking agent or a chain extender can be used. Typically, the crosslinking agent is used to synthesize a prepolymer, and the chain extender is used when a previously synthesized prepolymer is subjected to a chain extension reaction. Basically, the crosslinking agent and the chain extender can be appropriately selected from water, polyisocyanates, polyols, polyamines and the like depending on a purpose such as crosslinking and chain extension. As the chain extender, an agent capable of crosslinking a urethane resin can also be used.

(Salt)

The ink contains a particular salt. The "salt" means a compound formed from a cation and an anion. An ink containing a salt can accelerate the aggregation of a pigment on a recording medium, and thus can markedly improve the optical density of images recorded.

The salt contained in the ink is a compound formed by bonding one or more cations and one or more anions so as to neutralize the charges. The cation is at least one selected from the group consisting of alkali metal ions, an ammonium ion and organic ammonium ions. The anion is at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$.

Examples of the alkali metal ion include a lithium ion, a sodium ion and a potassium ion. Examples of the organic ammonium ion include cations of alkylamines having 1 or more to 3 or less carbon atoms, such as methylamine and ethylamine; and alkanolamines having 1 or more to 4 or less carbon atoms, such as monoethanolamine, diethanolamine and triethanolamine. Specifically, an alkali metal ion is preferred, and a potassium ion is particularly preferred.

Examples of the salt formed by bonding a cation and an anion include $(M_2)Cl$, $(M_2)Br$, $(M_2)I$, $(M_2)ClO$, $(M_2)ClO_2$, $(M_2)ClO_3$, $(M_2)ClO_4$, $(M_2)NO_2$, $(M_2)NO_3$, $(M_2)_2SO_4$, $(M_2)_2CO_3$, $(M_2)HCO_3$, $HCOO(M_2)$, $(COO(M_2))_2$, $COOH(COO(M_2))$, $CH_3COO(M_2)$, $C_2H_4(COO(M_2))_2$, $C_6H_5COO(M_2)$, $C_6H_4(COO(M_2))_2$, $(M_2)_3PO_4$, $(M_2)_2HPO_4$ and $(M_2)H_2PO_4$, where $(M_2)$ is a monovalent cation. Of them, potassium chloride, sodium acetate, sodium benzoate, potassium benzoate, ammonium benzoate, trisodium citrate, potassium phthalate and ammonium phthalate are preferred, for example. Specifically, potassium phthalate, sodium benzoate and potassium chloride are preferred, and potassium phthalate is particularly preferred.

In the ink, the content (% by mass) of the salt is preferably 0.20% by mass or more to 0.50% by mass or less based on the total mass of the ink. When the content of the salt is less than 0.20% by mass, the effect of improving the optical density of images recorded may be slightly reduced. When the content of the salt is more than 0.50% by mass, the effect of suppressing the irregular ejection caused after ejection of the ink for a long time may be slightly reduced.

(Water-Soluble Organic Solvent)

The ink contains a water-soluble organic solvent including glycerol and an additional solvent other than the glycerol. The content (% by mass) of the additional solvent relative to the content (% by mass) of the glycerol in terms of mass ratio is 0.6 times or less. The content (% by mass) of the additional solvent is preferably 5.00% by mass or more to 10.00% by mass or less based on the total mass of the ink. In the ink, the content (% by mass) of the water-soluble organic solvent is preferably 3.00% by mass or more to 50.00% by mass or less based on the total mass of the ink.

In additional solvents, the proportion (% by mass) of solvents having a dielectric constant of 28.0 or less is preferably 90.0% by mass or more and more preferably 95.0% by mass or more. Specifically, each additional solvent preferably has a dielectric constant of 28.0 or less. When a water-soluble organic solvent having a dielectric constant of more than 28.0 is contained, the aggregation property of the self-dispersible pigment is likely to deteriorate due to the water-soluble organic solvent, and the effect of improving the abrasion resistance of images recorded on glossy paper may be slightly reduced. As the water-soluble organic solvent having a dielectric constant of 28.0 or less, a nitrogen-containing compound such as 2-pyrrolidone; an alkylene glycol such as triethylene glycol; or a polyhydric alcohol such as 1,2-hexanediol is preferably used, for example.

The dielectric constant of a water-soluble organic solvent can be determined by using a dielectric constant meter (for example, trade name "BI-870" (manufactured by BROOKHAVEN INSTRUMENTS CORPORATION)) at a frequency of 10 kHz. In the present specification, the dielectric constant of a water-soluble organic solvent is a value determined at 25° C. In examples described later, the above dielectric constant meter was used to determine the dielectric constants of water-soluble organic solvents at 25° C. The dielectric constant of a water-soluble organic solvent that is solid at 25° C. can be determined by measuring the dielectric constant of a 50% by mass aqueous solution and calculating the objective dielectric constant in accordance with Equation (1). Although the "water-soluble organic solvent" typically means a liquid, a solvent that is solid at 25° C. (normal temperature) is also included in the water-soluble organic solvent in the present invention.

$$\varepsilon_{sol} = 2\varepsilon_{50\%} - \varepsilon_{water} \quad (1)$$

$\varepsilon_{sol}$: the dielectric constant of a water-soluble organic solvent solid at 25° C.
$\varepsilon_{50\%}$: the dielectric constant of a 50% by mass aqueous solution of the water-soluble organic solvent solid at 25° C.
$\varepsilon_{water}$: the dielectric constant of water The reason why the dielectric constant of a water-soluble organic solvent solid at 25° C. is calculated from the dielectric constant of a 50% by mass aqueous solution is as follows: Some of the water-soluble organic solvents that are solid at 25° C. and usable as a constitution component of an aqueous ink are difficult to give an aqueous solution having a high concentration of more than 50% by mass. Meanwhile, the dielectric constant of an aqueous solution having a low concentration of 10% by mass or less is dominated by the dielectric constant of water, and the probable (practical) dielectric constant value of such a water-soluble organic solvent cannot be determined. Hence, the inventors of the present invention have studied and found that most of the water-soluble organic solvents that are solid at 25° C. and usable in inks can give a measurable aqueous solution and the calculated dielectric constants match with the advantageous effects of the invention. On this account, a 50% by mass aqueous solution was used. For a water-soluble organic solvent that is solid at 25° C. but has a low solubility in water and cannot give a 50% by mass aqueous solution, an aqueous solution at saturated concentration is used, and the dielectric constant is calculated in accordance with the above calculation of $\varepsilon_{sol}$ and is used expediently.

Examples of the water-soluble organic solvent that is generally used in aqueous inks and is solid at 25° C. include 1,6-hexanediol, trimethylolpropane, ethylene urea, urea and polyethylene glycols having a number-average molecular weight of 1,000.

Specific examples of the water-soluble organic solvent include monohydric alcohols having 1 to 4 carbon atoms, such as methyl alcohol (33.1), ethyl alcohol (23.8), n-propyl alcohol, isopropyl alcohol (18.3), n-butyl alcohol, sec-butyl alcohol and tert-butyl alcohol; dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), 3-methyl-1,3-butanediol (24.0), 2-ethyl-1,3-hexanediol (18.5) and 3-methyl-1,5-pentanediol (23.9); polyhydric alcohols such as 1,2,6-hexanetriol (28.5), glycerol (42.3), trimethylolpropane (33.7) and trimethylolethane; alkylene glycols such as ethylene glycol (40.4), diethylene glycol (31.7), triethylene glycol (22.7), tetraethylene glycol, butylene glycol, hexylene glycol and thiodiglycol; glycol ethers such as diethylene glycol monomethyl ether, diethylene glycol monoethyl ether, triethylene glycol monoethyl ether, triethylene glycol monobutyl ether (9.8), tetraethylene glycol monobutyl ether (9.4) and tripropylene glycol monomethyl ether (8.5); polyalkylene glycols having a number-average molecular weight of 200 to 1,000, such as a polyethylene glycol having a number-average molecular weight of 200 (18.9), a polyethylene glycol having a number-average molecular weight of 600 (11.4), a polyethylene glycol having a number-average molecular weight of 1,000 (4.6) and a polypropylene glycol; nitrogen-containing compounds such as 2-pyrrolidone (28.0), N-methyl-2-pyrrolidone (32.0), 1-(2-hydroxyethyl)-2-pyrrolidone (37.6), 1,3-dimethyl-2-imidazolidinone, N-methylmorpholine, 1-(hydroxymethyl)-5,5-dimethylhydantoin (23.7), triethanolamine (31.9), γ-butyrolactone (41.9), urea (110.3) and ethylene urea (49.7); and sulfur-containing compounds such as dimethyl sulfoxide (48.9) and bis(2-hydroxyethyl sulfone). In the specific examples of the water-soluble organic solvent, the values in the parentheses are dielectric constants. As the water-soluble organic solvent contained in the ink, a water-soluble organic solvent having a dielectric constant of 3.0 or more and having a lower vapor pressure at 25° C. than that of water is preferably used.

In the ink, the content (% by mass) of the glycerol is preferably 10.00% by mass or more to 20.00% by mass or less and more preferably 12.00% by mass or more to 16.00% by mass or less based on the total mass of the ink. In the ink, the content (% by mass) of the glycerol relative to the content (% by mass) of the self-dispersible pigment in terms of mass ratio is preferably 4.5 times or more to 6.0 times or less. When the mass ratio is less than 4.5 times, the amount of the glycerol is slightly small relative to the amount of the self-dispersible pigment, and thus the glycerol is unlikely to be present among the particles of carbon black constituting the self-dispersible pigment when water or the like in the ink evaporates. Accordingly, it may be difficult to sufficiently suppress the generation of aggregation substances in an ink flow path or the like in a recording head, and the effect of suppressing the irregular ejection caused after ejection of the ink for a long time may be slightly reduced. When the mass ratio is more than 6.0, excess glycerol may be likely to prevent the self-dispersible pigment from aggregating, and the effect of improving the optical density of images recorded on plain paper may be slightly reduced.

(Water)

The ink is an aqueous ink at least containing water as the aqueous medium. As the water, deionized water (ion-exchanged water) is preferably used. The content (% by mass) of water in the ink is preferably 10.00% by mass or more to 90.00% by mass or less and more preferably 50.00% by mass or more to 90.00% by mass or less based on the total mass of the ink.

(Other Components)

The ink may further contain, in addition to the above components, various additives such as a surfactant, a pH adjuster, an antifoaming agent, an anticorrosive, an antiseptic agent, an antifungal agent, an antioxidant, a reduction inhibitor and an evaporation accelerator, as needed. Such an additive is contained at a considerably small content in typical inks and thus has a small influence on the advantageous effect of the invention. On this account, such an additive is excluded from the "water-soluble organic solvent" in the present invention and is eliminated from the calculation of the dielectric constant.

(Physical Properties of Ink)

The ink preferably has a viscosity of 1.0 mPa·s or more to 5.0 mPa·s or less and more preferably 1.0 mPa·s or more to 3.0 mPa·s or less at 25° C. The ink preferably has a static surface tension of 28 mN/m or more to 45 mN/m or less at 25° C. The ink preferably has a pH of 5 or more to 9 or less at 25° C.

<Ink Cartridge>

An ink cartridge pertaining to an embodiment of the present invention includes an ink and an ink storage portion storing the ink. The ink stored in the ink storage portion is the aqueous ink pertaining to an embodiment of the present invention described above. FIG. 1 is a schematic sectional view showing an ink cartridge pertaining to an embodiment of the present invention. As shown in FIG. 1, the bottom face of the ink cartridge has an ink supply port 12 for supplying the ink to a recording head. The inside of the ink cartridge is an ink storage portion for storing the ink. The ink storage portion includes an ink storage chamber 14 and an absorber storage chamber 16, and the ink storage chamber 14 and the absorber storage chamber 16 communicate with each other through a communication hole 18. The absorber storage chamber 16 communicates with the ink supply port 12. The ink storage chamber 14 stores a liquid ink 20, and the absorber storage chamber 16 stores absorbers 22 and 24 that are impregnated with the ink to hold the ink. The ink storage portion does not necessarily have the ink storage chamber that stores a liquid ink and can be a portion in which all the ink stored is held by absorbers. The ink storage portion does not necessarily have absorbers and can be a portion that stores all the ink in a liquid state. The ink storage portion may be integrated with a recording head to form an ink cartridge.

<Ink Jet Recording Method>

An ink jet recording method pertaining to an embodiment of the present invention is a method in which the above-described ink pertaining to an embodiment of the present invention is ejected from an ink jet recording head to record an image on a recording medium. The system for ejecting an ink is exemplified by a system of applying mechanical energy to an ink and a system of applying thermal energy to an ink. In the present invention, a system of applying thermal energy to an ink to eject the ink is particularly preferably adopted. The ink jet recording method may include any known steps as long as the ink pertaining to an embodiment of the present invention is used.

Figure 2A:
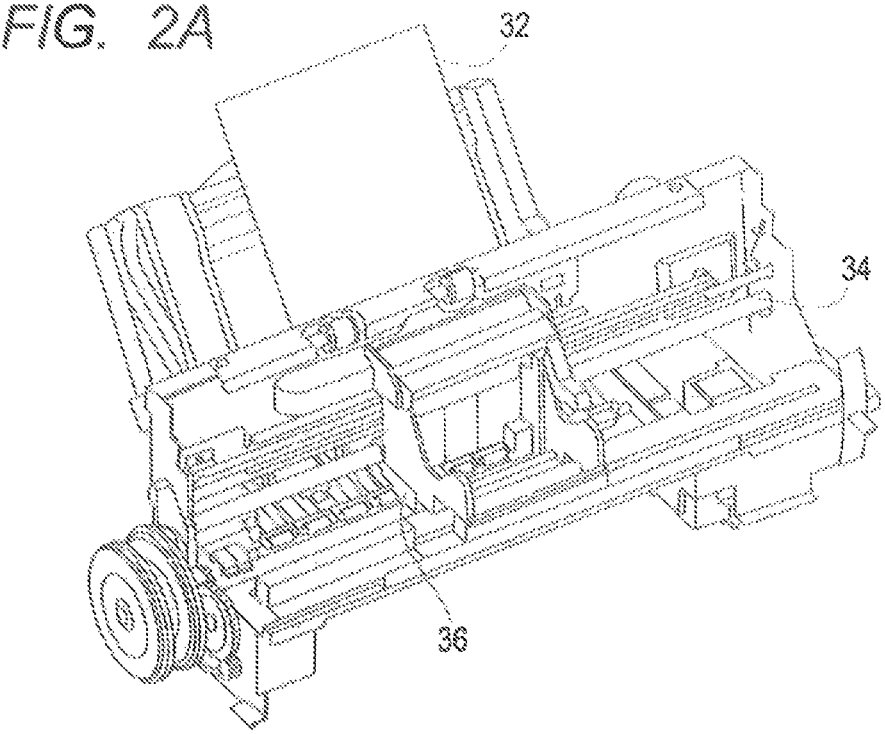
FIG. 2A is a perspective view of a principal part of an ink jet recording apparatus used in an ink jet recording method pertaining to an embodiment of the present invention.
Figure 2B:
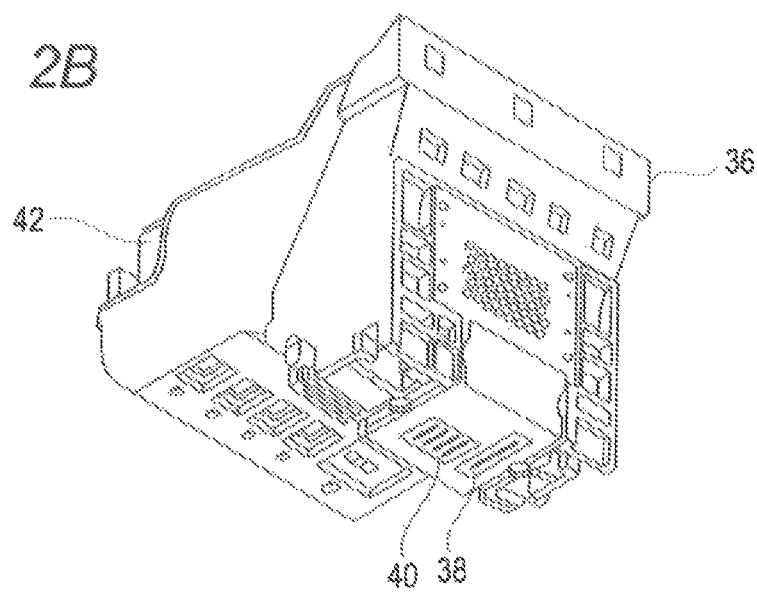
FIG. 2B is a perspective view of a head cartridge of an ink jet recording apparatus used in an ink jet recording method pertaining to an embodiment of the present invention.

FIG. 2A is a perspective view of a principal part of an ink jet recording apparatus used in an ink jet recording method pertaining to an embodiment of the present invention, and FIG. 2B is a perspective view of a head cartridge of an ink jet recording apparatus used in an ink jet recording method pertaining to an embodiment of the present invention. The ink jet recording apparatus includes a conveyance unit (not shown) for conveying a recording medium 32 and a carriage shaft 34. On the carriage shaft 34, a head cartridge 36 can be installed. The head cartridge 36 includes recording heads 38 and 40 and is so constructed that an ink cartridge 42 can be set. Inks (not shown) are ejected toward the recording medium 32 from the recording heads 38 and 40 while the head cartridge 36 is being carried in a main scanning direction along the carriage shaft 34. The recording medium 32 is then conveyed in a sub scanning direction by a conveyance unit (not shown), whereby an image is recorded on the recording medium 32.

The recording medium to be recorded by using an ink pertaining to an embodiment of the present invention may be any recording medium but is preferably a paper-based recording medium having permeability, such as plain paper and recording media having a coating layer (glossy paper and art paper). When such a recording medium is used, typically, the recording medium on which an image is recorded is not necessarily heated.

According to an embodiment of the present invention, an aqueous ink that enables the recording of images having high optical density and excellent toughness and has excellent reliability can be provided. According to other embodiments of the present invention, an ink cartridge including the aqueous ink and an ink jet recording method can be provided.

EXAMPLES

The present invention will next be described in further detail with reference to examples, comparative examples and reference examples, but the invention is not intended to be limited to the following examples without departing from the scope of the invention. The component amounts with "part" or "%" are based on mass unless otherwise noted.

<Preparation of Pigment Dispersion Liquid>

(Pigment Dispersion Liquid 1)

A solution prepared by dissolving 2.5 g of concentrated hydrochloric acid in 5.5 g of water was cooled at 5° C., and to the cooled solution, 0.7 g of 4-aminophthalic acid was added. A container containing the solution was placed in an ice bath, and to the solution stirred to maintain the temperature at 10° C. or less, a solution prepared by dissolving 0.9 g of sodium nitrite in 9.0 g of ion-exchanged water at 5° C. was added. After stirring for 15 minutes, 10.0 g of carbon black (a specific surface area of 220 m²/g, a DBP oil absorption amount of 105 mL/100 g) was added under stirring, and the whole was further stirred for 15 minutes, giving a slurry. The obtained slurry was filtered through a filter paper (trade name "Standard filter paper No. 2", manufactured by ADVANTEC), and the particles were thoroughly washed with water, and dried in an oven at 110° C. The sodium ions were then replaced with potassium ions by an ion exchange method, giving a self-dispersible pigment in which a —$C_6H_3$—$(COOK)_2$ group was bonded to the particle surface of carbon black. An appropriate amount of water was added to adjust the pigment content, giving a pigment dispersion liquid 1 having a pigment content of 20.0%.

(Pigment Dispersion Liquid 2)

A solution prepared by dissolving 2.5 g of concentrated hydrochloric acid in 5.5 g of water was cooled at 5° C., and to the cooled solution, 0.8 g of p-aminobenzoic acid was added. A container containing the solution was placed in an ice bath, and to the solution stirred to maintain the temperature at 10° C. or less, a solution prepared by dissolving 0.9 g of sodium nitrite in 9.0 g of ion-exchanged water at 5° C. was added. After stirring for 15 minutes, 9.0 g of carbon black (a specific surface area of 220 m²/g, a DBP oil absorption amount of 105 mL/100 g) was added under stirring, and the whole was further stirred for 15 minutes, giving a slurry. The obtained slurry was filtered through a filter paper (trade name "Standard filter paper No. 2", manufactured by ADVANTEC), and the particles were thoroughly washed with water, and dried in an oven at 110° C. The sodium ions were then replaced with potassium ions by an ion exchange method, giving a dispersion liquid. In this manner, a self-dispersible pigment in which a —$C_6H_4$—COOK group is bonded to the particle surface of carbon black was obtained. An appropriate amount of water was added to adjust the pigment content, giving a pigment dispersion liquid 2 having a pigment content of 20.0%.

(Pigment Dispersion Liquid 3)

Carbon black, a treatment agent, nitric acid and 200 mL of pure water were mixed, and the whole was mixed with a Silverson mixer at room temperature at a rotation speed of 4,000 rpm for 30 minutes, giving a mixture. As the treatment agent, sodium ((4-aminobenzoylamino)-methane-1,1-diyl) bisphosphonate was used. As the carbon black, trade name "Black Pearls 880" (manufactured by Cabot) was used. To the resulting mixture, an aqueous solution prepared by dissolving 0.3 g of sodium nitrite in a small amount of water was slowly added and mixed. By the mixing, the temperature of the mixture reached 60° C., and the mixture was reacted for 1 hour in the conditions. The pH of the mixture was then adjusted to 10 with an aqueous sodium hydroxide solution. After 30 minutes, pure water was added, and the mixture was subjected to diafiltration through a spectrum membrane, giving a pigment dispersion liquid 3 having a pigment content of 20.0%. The obtained pigment dispersion liquid 3 contained a self-dispersible pigment in which the group represented by Formula (I) was bonded to the particle surface of the pigment, in a dispersion state.

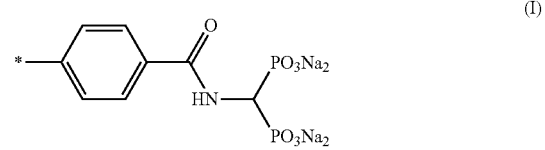

(I)

(Pigment Dispersion Liquid 4)

To 1,000 mL of water, 300 g of carbon black (pigment) was added, and the whole was stirred. To the mixture, 450 g of an aqueous sodium hypochlorite solution (an effective chlorine concentration of 12%) was added dropwise, and the whole was stirred at 100 to 105° C. for 10 hours. The carbon black used had a specific surface area of 220 m$^2$/g and a DBP oil absorption amount of 112 mL/100 g. The resulting mixture was purified by ultrafiltration, and an appropriate amount of ion-exchanged water was added to adjust the pigment content, giving a pigment dispersion liquid 4 having a pigment content of 20.0%.

(Pigment Dispersion Liquid 5)

A styrene-butyl acrylate-acrylic acid copolymer having an acid value of 120 mgKOH/g and a weight-average molecular weight of 10,000 was neutralized with a 10% aqueous potassium hydroxide solution. Carbon black having a specific surface area of 210 m$^2$/g and a DBP oil absorption amount of 74 mL/100 g, the neutralized styrene-acrylic acid copolymer (solid content) and pure water were mixed to give a mixture. The resulting mixture was dispersed with a sand grinder for 1 hour, and then was centrifuged to remove coarse particles. The centrifuged mixture was further subjected to pressure filtration through a microfilter with a pore size of 3.0 μm (manufactured by Fujifilm Corporation), giving a pigment dispersion liquid 5 in which the carbon black was dispersed by the resin in water. The obtained pigment dispersion liquid 5 had a pigment content of 20.0% and a resin dispersant content of 4.7%.

<Synthesis of Resin>

Each resin was synthesized by the procedure shown below. The acid value of the obtained resin was determined by the following method. First, hydrochloric acid was added to an aqueous resin solution to precipitate the resin. Next, the precipitated resin was dried under vacuum at 40° C. overnight, and then was dissolved in tetrahydrofuran to give a measurement sample. An automatic potential-difference titrator (trade name "AT-510", manufactured by Kyoto Electronics Manufacturing) was used to determine the acid value of the resin by potentiometric titration with a potassium hydroxide-methanol titration solution. The weight-average molecular weight of the obtained resin was determined by gel permeation chromatography (GPC) in terms of polystyrene.

(Acrylic Resin)

Monomers in types and amounts (unit: parts) shown in Table 1 were copolymerized in a usual manner, and the anionic group was neutralized with an aqueous potassium hydroxide solution. Ion-exchanged water was added to prepare a liquid containing one of water-soluble acrylic resins 1 to 11 having a resin content (solid content) of 20%. Properties of the acrylic resins are shown in Table 1. The components in Table 1 are shown below in detail.

St: styrene
BA: butyl acrylate
BzA: benzyl acrylate
AA: acrylic acid
MAA: methacrylic acid

TABLE 1

Synthetic conditions and properties of acrylic resins

| Acrylic resin number | Monomer | | | | | Properties | |
|---|---|---|---|---|---|---|---|
| | St | BA | BzA | AA | MAA | Acid value (mgKOH/g) | Weight-average molecular weight |
| 1 | 69.5 | 15.1 | | 15.4 | | 120 | 10,000 |
| 2 | 69.5 | 24.1 | | 6.4 | | 50 | 10,000 |
| 3 | 69.5 | 22.8 | | 7.7 | | 60 | 10,000 |
| 4 | 83.3 | | | 16.7 | | 130 | 10,000 |
| 5 | 69.5 | 12.5 | | 18.0 | | 140 | 10,000 |
| 6 | 69.5 | 15.1 | | 15.4 | | 120 | 7,000 |
| 7 | 69.5 | 15.1 | | 15.4 | | 120 | 8,000 |
| 8 | 69.5 | 15.1 | | 15.4 | | 120 | 20,000 |
| 9 | 69.5 | | 15.1 | 15.4 | | 120 | 10,000 |
| 10 | 69.5 | 12.1 | | | 18.4 | 120 | 10,000 |
| 11 | 69.5 | 15.1 | | 15.4 | | 120 | 21,000 |

(Urethane Resin)

A four-necked flask equipped with a thermometer, a stirrer, a nitrogen inlet tube and a reflux condenser was prepared. In the four-necked flask, a polyisocyanate, a polyol having no acid group and a polyol having an acid group in types and amounts shown in Table 2, 0.02 parts of dibutyltin dilaurate and 120 parts of methyl ethyl ketone were placed, and the whole was reacted in a nitrogen gas atmosphere at 80° C. for 6 hours. The reaction liquid was cooled to 40° C., then ion-exchanged water was added, and an aqueous potassium hydroxide solution was added while the mixture was stirred at a high speed with a homomixer, giving a resin solution. From the obtained resin solution, methyl ethyl ketone was distilled off by heating and decompression, giving a liquid containing one of water-soluble urethane resins 1 to 11 and having a resin content (solid content) of 20.0%. Properties of the urethane resins are shown in Table 2. The components in Table 2 are shown below in detail.

IPDI: isophorone diisocyanate
TDI: tolylene diisocyanate
PPG: polypropylene glycol (number-average molecular weight: 2,000)
DMPA: dimethylolpropionic acid

TABLE 2

Synthetic conditions and properties of urethane resins

| Urethane resin number | Polyisocyanate | | Polyol having no acid group | | Polyol having an acid group | | Properties | |
|---|---|---|---|---|---|---|---|---|
| | Type | Amount (parts) | Type | Amount (parts) | Type | Amount (parts) | Acid value (mgKOH/g) | Weight-average molecular weight |
| 1 | IPDI | 38.7 | PPG | 44.5 | DMPA | 16.8 | 70 | 15,000 |
| 2 | IPDI | 41.1 | PPG | 46.9 | DMPA | 12.0 | 50 | 15,000 |
| 3 | IPDI | 40.5 | PPG | 45.1 | DMPA | 14.4 | 60 | 15,000 |
| 4 | IPDI | 32.4 | PPG | 36.6 | DMPA | 31.0 | 130 | 15,000 |
| 5 | IPDI | 30.3 | PPG | 36.3 | DMPA | 33.4 | 140 | 15,000 |

TABLE 2-continued

Synthetic conditions and properties of urethane resins

| Urethane resin number | Polyisocyanate Type | Amount (parts) | Polyol having no acid group Type | Amount (parts) | Polyol having an acid group Type | Amount (parts) | Acid value (mgKOH/g) | Weight-average molecular weight |
|---|---|---|---|---|---|---|---|---|
| 6 | IPDI | 38.7 | PPG | 44.5 | DMPA | 16.8 | 70 | 7,000 |
| 7 | IPDI | 38.7 | PPG | 44.5 | DMPA | 16.8 | 70 | 8,000 |
| 8 | IPDI | 38.7 | PPG | 44.5 | DMPA | 16.8 | 70 | 20,000 |
| 9 | IPDI | 38.7 | PPG | 44.5 | DMPA | 16.8 | 70 | 15,000 |
| 10 | TDI | 38.7 | PPG | 44.5 | DMPA | 16.8 | 70 | 15,000 |
| 11 | IPDI | 38.7 | PPG | 44.5 | DMPA | 16.8 | 70 | 21,000 |

<Preparation of Ink>

Examples 1 to 47, Comparative Examples 1 to 11, Reference Examples 1 to 4

Components (unit: %) shown in middle rows in Table 3 were mixed and thoroughly stirred, and the resulting mixtures were subjected to pressure filtration through a microfilter with a pore size of 3.0 μm (manufactured by Fujifilm Corporation), giving inks. In Table 3, "Acetylenol E100" is the trade name of a nonionic surfactant (ethylene oxide adduct of acetylene glycol) manufactured by Kawaken Fine Chemicals. The pigment contents P (%), the acrylic resin contents A (%), the urethane resin contents U (%), the resin total contents R (%) and the glycerol contents G (%) in the prepared inks are shown in lower rows in Table 3. The contents of solvents other than glycerol (additional solvents) in the prepared inks are shown as "first solvent content F (%)" in a lower row in Table 3. The total contents of water-soluble organic solvents in the prepared inks are shown as "solvent content S (%)" in a lower row in Table 3. P/R values (times), F/G values (times), and G/P values (times) are shown in lower rows in Table 3.

TABLE 3

Formulations and properties of inks

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Acrylic resin type | 1 | 1 | 1 | 1 | 1 | 1 | 1 | 1 | 1 | 1 | 1 | 1 | 1 | 1 | 1 | 1 |
| Urethane resin type | 1 | 1 | 1 | 1 | 1 | 1 | 1 | 1 | 1 | 1 | 1 | 1 | 1 | 1 | 1 | 1 |
| Liquid containing acrylic resin | 3.50 | 3.50 | 3.50 | 3.50 | 3.50 | 3.50 | 3.50 | 3.50 | 3.50 | 3.50 | 3.50 | 4.00 | 4.00 | 2.50 | 2.50 | 2.50 |
| Liquid containing urethane resin | 1.50 | 1.50 | 1.50 | 1.50 | 1.50 | 1.50 | 1.50 | 1.50 | 1.50 | 1.50 | 1.50 | 2.30 | 2.00 | 1.25 | 1.20 | 1.50 |
| Pigment dispersion liquid 1 | 15.00 | | | | 15.00 | 15.00 | 15.00 | 15.00 | 15.00 | 15.00 | 15.00 | 15.00 | 15.00 | 15.00 | 15.00 | 10.00 |
| Pigment dispersion liquid 2 | | 15.00 | | | | | | | | | | | | | | |
| Pigment dispersion liquid 3 | | | 15.00 | | | | | | | | | | | | | |
| Pigment dispersion liquid 4 | | | | 15.00 | | | | | | | | | | | | |
| Pigment dispersion liquid 5 | | | | | | | | | | | | | | | | |
| Ethylene urea (49.7) | | | | | | | | 5.00 | | | | | | | | |
| Glycerol (42.3) | 14.00 | 14.00 | 14.00 | 14.00 | 14.00 | 14.00 | 14.00 | 13.20 | 13.60 | 18.00 | 18.30 | 14.00 | 14.00 | 14.00 | 14.00 | 11.50 |
| Trimethylolpropane (33.7) | | | | | | | 3.00 | | | | | | | | | |
| 2-Pyrrolidone (28.0) | 3.00 | 3.00 | 3.00 | 3.00 | 3.00 | 3.00 | 3.00 | | 3.00 | 3.00 | 3.00 | 3.00 | 3.00 | 3.00 | 3.00 | 3.00 |
| Triethylene glycol (22.7) | 5.00 | 5.00 | 5.00 | 5.00 | 5.00 | 5.00 | | 5.00 | 5.00 | 5.00 | 5.00 | 5.00 | 5.00 | 5.00 | 5.00 | 4.00 |
| Potassium phthalate | 0.40 | 0.40 | 0.40 | 0.40 | | | 0.40 | 0.40 | 0.40 | 0.40 | 0.40 | 0.40 | 0.40 | 0.40 | 0.40 | 0.40 |
| Sodium benzoate | | | | | 0.40 | | | | | | | | | | | |
| Potassium chloride | | | | | | 0.40 | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Pure water | 57.45 | 57.45 | 57.45 | 57.45 | 57.45 | 57.45 | 57.45 | 58.25 | 57.85 | 53.45 | 53.15 | 56.15 | 56.45 | 58.70 | 58.75 | 66.95 |
| Pigment content P (%) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 2.00 |
| Acrylic resin content A (%) | 0.70 | 0.70 | 0.70 | 0.70 | 0.70 | 0.70 | 0.70 | 0.70 | 0.70 | 0.70 | 0.70 | 0.80 | 0.80 | 0.50 | 0.50 | 0.50 |
| Urethane resin content U (%) | 0.30 | 0.30 | 0.30 | 0.30 | 0.30 | 0.30 | 0.30 | 0.30 | 0.30 | 0.30 | 0.30 | 0.46 | 0.40 | 0.25 | 0.24 | 0.30 |
| Resin total content R (%) | 1.00 | 1.00 | 1.00 | 1.00 | 1.00 | 1.00 | 1.00 | 1.00 | 1.00 | 1.00 | 1.00 | 1.26 | 1.20 | 0.75 | 0.74 | 0.80 |
| Glycerol content G (%) | 14.00 | 14.00 | 14.00 | 14.00 | 14.00 | 14.00 | 14.00 | 13.20 | 13.60 | 18.00 | 18.30 | 14.00 | 14.00 | 14.00 | 14.00 | 11.50 |
| First solvent content F (%) | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 | 7.00 |
| Solvent content S (%) | 22.00 | 22.00 | 22.00 | 22.00 | 22.00 | 22.00 | 22.00 | 21.20 | 21.60 | 26.00 | 26.30 | 22.00 | 22.00 | 22.00 | 22.00 | 18.50 |
| P/R (times) | 3.0 | 3.0 | 3.0 | 3.0 | 3.0 | 3.0 | 3.0 | 3.0 | 3.0 | 3.0 | 3.0 | 2.4 | 2.5 | 4.0 | 4.1 | 2.5 |
| F/G (times) | 0.6 | 0.6 | 0.6 | 0.6 | 0.6 | 0.6 | 0.6 | 0.6 | 0.6 | 0.4 | 0.4 | 0.6 | 0.6 | 0.6 | 0.6 | 0.6 |
| G/P (times) | 4.7 | 4.7 | 4.7 | 4.7 | 4.7 | 4.7 | 4.7 | 4.4 | 4.5 | 6.0 | 6.1 | 4.7 | 4.7 | 4.7 | 4.7 | 5.8 |

| | Example | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| Acrylic resin type | 1 | 1 | 1 | 1 | 1 | 1 | 1 | 1 | 1 | 1 | 2 | 3 | 4 | 5 | 6 | 7 |
| Urethane resin type | 1 | 1 | 1 | 1 | 1 | 1 | 1 | 1 | 1 | — | — | — | — | — | — | — |
| Liquid containing acrylic resin | 4.00 | 1.50 | 1.90 | 5.00 | 5.50 | 3.50 | 3.50 | 3.50 | 3.50 | 5.00 | 5.00 | 5.00 | 5.00 | 5.00 | 5.00 | 5.00 |
| Liquid containing urethane resin | 2.30 | 0.60 | 0.60 | 3.00 | 3.00 | 1.50 | 1.50 | 1.50 | 1.50 | | | | | | | |

TABLE 3-continued

Formulations and properties of inks

| | | | | | | | | | | | | | | | | |
|---|---|---|---|---|---|---|---|---|---|---|---|---|---|---|---|---|
| Pigment dispersion liquid 1 | 20.00 | 10.00 | 10.00 | 20.00 | 20.00 | 15.00 | 15.00 | 15.00 | 15.00 | 15.00 | 15.00 | 15.00 | 15.00 | 15.00 | 15.00 | 15.00 |
| Pigment dispersion liquid 2 | | | | | | | | | | | | | | | | |
| Pigment dispersion liquid 3 | | | | | | | | | | | | | | | | |
| Pigment dispersion liquid 4 | | | | | | | | | | | | | | | | |
| Pigment dispersion liquid 5 | | | | | | | | | | | | | | | | |
| Ethylene urea (49.7) | | | | | | | | | | | | | | | | |
| Glycerol (42.3) | 20.00 | 12.00 | 12.00 | 19.00 | 19.00 | 14.00 | 14.00 | 14.00 | 14.00 | 14.00 | 14.00 | 14.00 | 14.00 | 14.00 | 14.00 | 14.00 |
| Trimethylolpropane (33.7) | | | | | | | | | | | | | | | | |
| 2-Pyrrolidone (28.0) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Triethylene glycol (22.7) | 5.00 | 4.50 | 4.50 | 5.00 | 5.00 | 5.00 | 5.00 | 5.00 | 5.00 | 5.00 | 5.00 | 5.00 | 5.00 | 5.00 | 5.00 | 5.00 |
| Potassium phthalate | 0.40 | 0.40 | 0.40 | 0.40 | 0.40 | 0.10 | 0.20 | 0.50 | 0.60 | 0.40 | 0.40 | 0.40 | 0.40 | 0.40 | 0.40 | 0.40 |
| Sodium benzoate | | | | | | | | | | | | | | | | |
| Potassium chloride | | | | | | | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Pure water | 45.15 | 67.85 | 67.45 | 44.45 | 43.95 | 57.75 | 57.65 | 57.35 | 57.25 | 57.45 | 57.45 | 57.45 | 57.45 | 57.45 | 57.45 | 57.45 |
| Pigment content P (%) | 4.00 | 2.00 | 2.00 | 4.00 | 4.00 | 3.00 | 3.00 | 3.00 | 3.00 | 3.00 | 3.00 | 3.00 | 3.00 | 3.00 | 3.00 | 3.00 |
| Acrylic resin content A (%) | 0.80 | 0.30 | 0.38 | 1.00 | 1.10 | 0.70 | 0.70 | 0.70 | 0.70 | 1.00 | 1.00 | 1.00 | 1.00 | 1.00 | 1.00 | 1.00 |
| Urethane resin content U (%) | 0.46 | 0.12 | 0.12 | 0.60 | 0.60 | 0.30 | 0.30 | 0.30 | 0.30 | 0.00 | 0.00 | 0.00 | 0.00 | 0.00 | 0.00 | 0.00 |
| Resin total content R (%) | 1.26 | 0.42 | 0.50 | 1.60 | 1.70 | 1.00 | 1.00 | 1.00 | 1.00 | 1.00 | 1.00 | 1.00 | 1.00 | 1.00 | 1.00 | 1.00 |
| Glycerol content G (%) | 20.00 | 12.00 | 12.00 | 19.00 | 19.00 | 14.00 | 14.00 | 14.00 | 14.00 | 14.00 | 14.00 | 14.00 | 14.00 | 14.00 | 14.00 | 14.00 |
| First solvent content F (%) | 8.00 | 7.50 | 7.50 | 8.00 | 8.00 | 8.00 | 8.00 | 8.00 | 8.00 | 8.00 | 8.00 | 8.00 | 8.00 | 8.00 | 8.00 | 8.00 |
| Solvent content S (%) | 28.00 | 19.50 | 19.50 | 27.00 | 27.00 | 22.00 | 22.00 | 22.00 | 22.00 | 22.00 | 22.00 | 22.00 | 22.00 | 22.00 | 22.00 | 22.00 |
| P/R (times) | 3.2 | 4.8 | 4.0 | 2.5 | 2.4 | 3.0 | 3.0 | 3.0 | 3.0 | 3.0 | 3.0 | 3.0 | 3.0 | 3.0 | 3.0 | 3.0 |
| F/G (times) | 0.4 | 0.6 | 0.6 | 0.4 | 0.4 | 0.6 | 0.6 | 0.6 | 0.6 | 0.6 | 0.6 | 0.6 | 0.6 | 0.6 | 0.6 | 0.6 |
| G/P (times) | 5.0 | 6.0 | 6.0 | 4.8 | 4.8 | 4.7 | 4.7 | 4.7 | 4.7 | 4.7 | 4.7 | 4.7 | 4.7 | 4.7 | 4.7 | 4.7 |

| | Example | | | | | | | | | | | | | | |
|---|---|---|---|---|---|---|---|---|---|---|---|---|---|---|---|
| | 33 | 34 | 35 | 36 | 37 | 38 | 39 | 40 | 41 | 42 | 43 | 44 | 45 | 46 | 47 |
| Acrylic resin type | 8 | 9 | 10 | — | — | — | — | — | — | — | — | — | — | 2 | 1 |
| Urethane resin type | — | — | — | 1 | 2 | 3 | 4 | 5 | 6 | 7 | 8 | 9 | 10 | — | 5 |
| Liquid containing acrylic resin | 5.00 | 5.00 | 5.00 | | | | | | | | | | | 10.00 | |
| Liquid containing urethane resin | | | | 5.00 | 5.00 | 5.00 | 5.00 | 5.00 | 5.00 | 5.00 | 5.00 | 5.00 | 5.00 | | 10.00 |
| Pigment dispersion liquid 1 | 15.00 | 15.00 | 15.00 | 15.00 | 15.00 | 15.00 | 15.00 | 15.00 | 15.00 | 15.00 | 15.00 | 15.00 | 15.00 | 20.00 | 20.00 |
| Pigment dispersion liquid 2 | | | | | | | | | | | | | | | |
| Pigment dispersion liquid 3 | | | | | | | | | | | | | | | |
| Pigment dispersion liquid 4 | | | | | | | | | | | | | | | |
| Pigment dispersion liquid 5 | | | | | | | | | | | | | | | |
| Ethylene urea (49.7) | | | | | | | | | | | | | | 5.00 | 5.00 |
| Glycerol (42.3) | 14.00 | 14.00 | 14.00 | 14.00 | 14.00 | 14.00 | 14.00 | 14.00 | 14.00 | 14.00 | 14.00 | 14.00 | 14.00 | 14.00 | 14.00 |
| Trimethylolpropane (33.7) | | | | | | | | | | | | | | 3.00 | 3.00 |
| 2-Pyrrolidone (28.0) | 3.00 | 3.00 | 3.00 | 3.00 | 3.00 | 3.00 | 3.00 | 3.00 | 3.00 | 3.00 | 3.00 | 3.00 | 3.00 | | |
| Triethylene glycol (22.7) | 5.00 | 5.00 | 5.00 | 5.00 | 5.00 | 5.00 | 5.00 | 5.00 | 5.00 | 5.00 | 5.00 | 5.00 | 5.00 | | |
| Potassium phthalate | 0.40 | 0.40 | 0.40 | 0.40 | 0.40 | 0.40 | 0.40 | 0.40 | 0.40 | 0.40 | 0.40 | 0.40 | 0.40 | 0.10 | 0.10 |
| Sodium benzoate | | | | | | | | | | | | | | | |
| Potassium chloride | | | | | | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Pure water | 57.45 | 57.45 | 57.45 | 57.45 | 57.45 | 57.45 | 57.45 | 57.45 | 57.45 | 57.45 | 57.45 | 57.45 | 57.45 | 47.75 | 47.75 |
| Pigment content P (%) | 3.00 | 3.00 | 3.00 | 3.00 | 3.00 | 3.00 | 3.00 | 3.00 | 3.00 | 3.00 | 3.00 | 3.00 | 3.00 | 4.00 | 4.00 |
| Acrylic resin content A (%) | 1.00 | 1.00 | 1.00 | 0.00 | 0.00 | 0.00 | 0.00 | 0.00 | 0.00 | 0.00 | 0.00 | 0.00 | 0.00 | 2.00 | 0.00 |
| Urethane resin content U (%) | 0.00 | 0.00 | 0.00 | 1.00 | 1.00 | 1.00 | 1.00 | 1.00 | 1.00 | 1.00 | 1.00 | 1.00 | 1.00 | 0.00 | 2.00 |
| Resin total content R (%) | 1.00 | 1.00 | 1.00 | 1.00 | 1.00 | 1.00 | 1.00 | 1.00 | 1.00 | 1.00 | 1.00 | 1.00 | 1.00 | 2.00 | 2.00 |
| Glycerol content G (%) | 14.00 | 14.00 | 14.00 | 14.00 | 14.00 | 14.00 | 14.00 | 14.00 | 14.00 | 14.00 | 14.00 | 14.00 | 14.00 | 14.00 | 14.00 |
| First solvent content F (%) | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 |
| Solvent content S (%) | 22.00 | 22.00 | 22.00 | 22.00 | 22.00 | 22.00 | 22.00 | 22.00 | 22.00 | 22.00 | 22.00 | 22.00 | 22.00 | 22.00 | 22.00 |
| P/R (times) | 3.0 | 3.0 | 3.0 | 3.0 | 3.0 | 3.0 | 3.0 | 3.0 | 3.0 | 3.0 | 3.0 | 3.0 | 3.0 | 2.0 | 2.0 |
| F/G (times) | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| G/P (times) | 4.7 | 4.7 | 4.7 | 4.7 | 4.7 | 4.7 | 4.7 | 4.7 | 4.7 | 4.7 | 4.7 | 4.7 | 4.7 | 3.5 | 3.5 |

| | Comparative Example | | | | | | | | | | | Reference Example | | | |
|---|---|---|---|---|---|---|---|---|---|---|---|---|---|---|---|
| | 1 | 2 | 3 | 4 | 5 | 6 | 7 | 8 | 9 | 10 | 11 | 1 | 2 | 3 | 4 |
| Acrylic resin type | — | — | 11 | 11 | — | 1 | 1 | — | 1 | 1 | — | — | — | — | 1 |
| Urethane resin type | 1 | — | 11 | — | 11 | 1 | — | 1 | 1 | — | 1 | 1 | — | 11 | — |
| Liquid containing acrylic resin | | | 3.50 | 5.00 | | 3.50 | 5.00 | | 3.50 | 5.00 | | | | 3.50 | 3.50 |
| Liquid containing urethane resin | 1.50 | | 1.50 | | 5.00 | 1.50 | | 5.00 | 1.50 | | 5.00 | 1.50 | | 1.50 | 1.50 |
| Pigment dispersion liquid 1 | | 15.00 | 15.00 | 15.00 | 15.00 | 15.00 | 15.00 | 15.00 | 15.00 | 15.00 | 15.00 | | 15.00 | 15.00 | 15.00 |
| Pigment dispersion liquid 2 | | | | | | | | | | | | | | | |
| Pigment dispersion liquid 3 | | | | | | | | | | | | | | | |
| Pigment dispersion liquid 4 | | | | | | | | | | | | | | | |
| Pigment dispersion liquid 5 | 15.00 | | | | | | | | | | | 15.00 | | | |
| Ethylene urea (49.7) | | | | | | | | | | | | | | | |
| Glycerol (42.3) | 14.00 | 14.00 | 14.00 | 14.00 | 14.00 | 12.00 | 12.00 | 12.00 | 14.00 | 14.00 | 14.00 | 12.00 | 12.00 | 12.00 | 12.00 |
| Trimethylolpropane (33.7) | | | | | | | | | | | | | | | |
| 2-Pyrrolidone (28.0) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Triethylene glycol (22.7) | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |

TABLE 3-continued

Formulations and properties of inks

| | | | | | | | | | | | | | | | |
|---|---|---|---|---|---|---|---|---|---|---|---|---|---|---|---|
| Potassium phthalate | 0.40 | 0.40 | 0.40 | 0.40 | 0.40 | 0.40 | 0.40 | 0.40 | | | | 0.40 | 0.40 | 0.40 | |
| Sodium benzoate | | | | | | | | | | | | | | | |
| Potassium chloride | | | | | | | | | | | | | | | |
| Acetylenol E100 | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| Pure water | 60.95 | 62.45 | 57.45 | 57.45 | 57.45 | 59.45 | 59.45 | 59.45 | 57.85 | 57.85 | 57.85 | 62.95 | 64.45 | 59.45 | 59.85 |
| Pigment content P (%) | 3.00 | 3.00 | 3.00 | 3.00 | 3.00 | 3.00 | 3.00 | 3.00 | 3.00 | 3.00 | 3.00 | 3.00 | 3.00 | 3.00 | 3.00 |
| Acrylic resin content A (%) | 0.70 | 0.00 | 0.70 | 1.00 | 0.00 | 0.70 | 1.00 | 0.00 | 0.70 | 1.00 | 0.00 | 0.70 | 0.00 | 0.70 | 0.70 |
| Urethane resin content U (%) | 0.30 | 0.00 | 0.30 | 0.00 | 1.00 | 0.30 | 0.00 | 1.00 | 0.30 | 0.00 | 1.00 | 0.30 | 0.00 | 0.30 | 0.30 |
| Resin total content R (%) | 1.00 | 0.00 | 1.00 | 1.00 | 1.00 | 1.00 | 1.00 | 1.00 | 1.00 | 1.00 | 1.00 | 1.00 | 0.00 | 1.00 | 1.00 |
| Glycerol content G (%) | 14.00 | 14.00 | 14.00 | 14.00 | 14.00 | 12.00 | 12.00 | 12.00 | 14.00 | 14.00 | 14.00 | 12.00 | 12.00 | 12.00 | 12.00 |
| First solvent content F (%) | 8.00 | 8.00 | 8.00 | 8.00 | 8.00 | 8.00 | 8.00 | 8.00 | 8.00 | 8.00 | 8.00 | 8.00 | 8.00 | 8.00 | 8.00 |
| Solvent content S (%) | 22.00 | 22.00 | 22.00 | 22.00 | 22.00 | 20.00 | 20.00 | 20.00 | 22.00 | 22.00 | 22.00 | 20.00 | 20.00 | 20.00 | 20.00 |
| P/R (times) | 3.0 | — | 3.0 | 3.0 | 3.0 | 3.0 | 3.0 | 3.0 | 3.0 | 3.0 | 3.0 | 3.0 | — | 3.0 | 3.0 |
| F/G (times) | 0.6 | 0.6 | 0.6 | 0.6 | 0.6 | 0.7 | 0.7 | 0.7 | 0.6 | 0.6 | 0.6 | 0.7 | 0.7 | 0.7 | 0.7 |
| G/P (times) | 4.7 | 4.7 | 4.7 | 4.7 | 4.7 | 4.0 | 4.0 | 4.0 | 4.7 | 4.7 | 4.7 | 4.0 | 4.0 | 4.0 | 4.0 |

Comparative Example 12

The ink in "Example 33" in Japanese Patent Application Laid-Open No. 2012-214713 was used as an ink of "Comparative Example 12". The ink contains a urethane resin having a weight-average molecular weight of 50,000, and the additional solvent content (% by mass) relative to the glycerol content (% by mass) in terms of mass ratio is more than 0.6 times.

Comparative Example 13

The ink in "Example 1-81" in Japanese Patent Application Laid-Open No. 2013-253230 was used as an ink of "Comparative Example 13". In the ink, the additional solvent content (% by mass) relative to the glycerol content (% by mass) in terms of mass ratio is more than 0.6 times.

Comparative Example 14

The ink in "Example 1-83" in Japanese Patent Application Laid-Open No. 2013-253230 was used as an ink of "Comparative Example 14". In the ink, the additional solvent content (% by mass) relative to the glycerol content (% by mass) in terms of mass ratio is more than 0.6 times.

Comparative Example 15

The ink of "No. 40" in Japanese Patent Application Laid-Open No. 2016-044236 was used as an ink of "Comparative Example 15". In the ink, the additional solvent content (% by mass) relative to the glycerol content (% by mass) in terms of mass ratio is more than 0.6 times.

Comparative Example 16

The ink in "Example 4" in Japanese Patent Application Laid-Open No. 2006-045514 was used as an ink of "Comparative Example 16". The ink contains neither a resin nor a particular salt.

Comparative Example 17

A pigment dispersion liquid 6 containing a self-dispersible pigment in which a —$C_6H_3$—$(COOK)_2$ group was bonded to the particle surface of carbon black was prepared in a usual manner. In the pigment dispersion liquid, the pigment content was 10.0%. Separately, 101.5 parts of styrene, 60.0 parts of methoxydiethylene glycol methacrylate and 38.5 parts acrylic acid were copolymerized in a usual manner, and then the anionic group was neutralized with an aqueous potassium hydroxide solution. In this manner, a liquid (resin-containing aqueous solution A) containing a water-soluble resin (a weight-average molecular weight of 15,000, an acid value of 150 mgKOH/g) at a resin content (solid content) of 20.0% was prepared.

The components shown below were mixed and thoroughly stirred, and the mixture was subjected to pressure filtration through a microfilter with a pore size of 3.0 m (manufactured by Fujifilm Corporation), giving an ink of Comparative Example 17.

| | |
|---|---|
| Pigment dispersion liquid 6 | 30.0 parts |
| Resin-containing aqueous solution A | 20.0 parts |
| Sodium benzoate | 2.88 parts |
| Glycerol | 9.00 parts |
| Diethylene glycol | 5.00 parts |
| Triethylene glycol | 5.00 parts |
| Acetylenol E100 | 0.10 parts |
| Pure water | 28.02 parts |

Comparative Example 18

Carbon black was subjected to ozone oxidation in a usual manner, giving a dispersion liquid. The pH of the dispersion liquid was adjusted to 10.0 with potassium hydroxide and the concentration was also adjusted, giving a pigment dispersion liquid 7 having a pigment content of 10.0%. The pigment in the pigment dispersion liquid 7 was a self-dispersible pigment in which a —COOK group was bonded to the particle surface of carbon black. The components shown below were mixed and thoroughly stirred, and the mixture was subjected to pressure filtration through a microfilter with a pore size of 3.0 μm (manufactured by Fujifilm Corporation), giving an ink of Comparative Example 18.

| | |
|---|---|
| Pigment dispersion liquid 7 | 30.0 parts |
| Resin-containing aqueous solution A | 20.0 parts |
| Sodium benzoate | 2.88 parts |
| Glycerol | 9.00 parts |
| Diethylene glycol | 5.00 parts |
| Triethylene glycol | 5.00 parts |
| Acetylenol E100 | 0.10 parts |
| Pure water | 28.02 parts |

Comparative Example 19

First, 78.7 parts of tolylene diisocyanate, 70.1 parts of polyethylene glycol (a number-average molecular weight of 1,000) and 51.2 parts of dimethylolpropionic acid were used and polymerized in a usual manner, giving a urethane resin-containing aqueous solution B. The urethane resin had a weight-average molecular weight of 15,000 and an acid value of 107 mgKOH/g. In the urethane resin-containing aqueous solution, the resin content (solid content) was 20.0%. The components shown below were mixed and thoroughly stirred, and the mixture was subjected to pressure filtration through a microfilter with a pore size of 3.0 µm (manufactured by Fujifilm Corporation), giving an ink of Comparative Example 19.

| | |
|---|---|
| Pigment dispersion liquid 6 | 30.0 parts |
| Urethane resin-containing aqueous solution B | 20.0 parts |
| Sodium benzoate | 2.88 parts |
| Glycerol | 9.00 parts |
| Diethylene glycol | 5.00 parts |
| Triethylene glycol | 5.00 parts |
| Acetylenol E100 | 0.10 parts |
| Pure water | 28.02 parts |

Comparative Example 20

The components shown below were mixed and thoroughly stirred, and the mixture was subjected to pressure filtration through a microfilter with a pore size of 3.0 m (manufactured by Fujifilm Corporation), giving an ink of Comparative Example 20.

| | |
|---|---|
| Pigment dispersion liquid 7 | 30.0 parts |
| Urethane resin-containing aqueous solution B | 20.0 parts |
| Sodium benzoate | 2.88 parts |
| Glycerol | 9.00 parts |
| Diethylene glycol | 5.00 parts |
| Triethylene glycol | 5.00 parts |
| Acetylenol E100 | 0.10 parts |
| Pure water | 28.02 parts |

<Evaluation>

An ink jet recording apparatus (trade name "PIXUS Pro 9500", manufactured by Canon) was used to perform the evaluations described below. The recording conditions were a temperature of 23° C. and a relative humidity of 55%. In the examples, the image recorded in conditions in which about 16 ng of an ink drop is applied to a unit area of 1/600 inch× 1/600 inch (1 pixel) is defined as a recording duty of 100%. In the present invention, "AA", "A" and "B" were regarded as a preferred level, and "C" was regarded as an unacceptable level on the basis of the following criteria of each evaluation item. The evaluation results are shown in Table 4.

(Optical Density)

A cartridge filled with a prepared ink was installed in an ink jet recording apparatus. On a recording medium (plain paper, trade name "Bright White", manufactured by Hewlett-Packard), a 2 cm×2 cm solid image (recording duty: 150%) was recorded. After the image was allowed to stand for a day, the optical density of the solid image was determined by using a spectrophotometer (trade name "Spectorolino", manufactured by Gretag Macbeth) in conditions of a D50 light source and a visual field of 2°, and the optical density of the image was evaluated on the basis of the following criteria.

A: The optical density was 1.55 or more.
B: The optical density was 1.50 or more to less than 1.55.
C: The optical density was less than 1.50.

(Abrasion Resistance)

An ink cartridge filled with a prepared ink was installed in an ink jet recording apparatus. On a recording medium (glossy paper, trade name "Canon Photo Paper, Glossy Gold, GL-101, manufactured by Canon), a 1.0 inch×0.5 inch solid image (recording duty: 100%) was recorded. The recorded solid image 3 minutes after recording was scratched by a nail, and the abrasion resistance of the image was evaluated on the basis of the following criteria.

AA: No white background part was exposed.
A: Almost no white background part was exposed.
B: A white background was slightly exposed.
C: A white background part was obviously exposed.

(Highlighter Resistance)

An ink cartridge filled with a prepared ink was installed in an ink jet recording apparatus. On a recording medium (plain paper, trade name "GF-500", manufactured by Canon), a vertical line with a width of 1/10 inches was recorded. On the recorded vertical line 3 minutes after recording, marking was performed by using a yellow line highlighter (trade name "OPTEX2", manufactured by Zebra), and immediately after that, marking was performed in a white background area on a PPC paper. Contamination of the pen tip and stain of the marking in the white background area were observed, and the highlighter resistance was evaluated on the basis of the following criteria.

AA: The pen tip was not contaminated, and no stain was observed in the white background area.
A: The pen tip was slightly contaminated, but no stain was observed in the white background area.
B: The pen tip was contaminated, but almost no stain was observed in the white background area.
C: The pen tip was contaminated, and stain was observed in the white background area.

(Irregular Ejection)

An ink cartridge filled with a prepared ink was installed in an ink jet recording apparatus. A nozzle check pattern was recorded to ascertain that the ink was normally ejected from all ejection orifices. On the whole area of recording media with an A4 size (plain paper, trade name "GF-500", manufactured by Canon), 250 solid images were recorded at a recording duty of 5%, then the apparatus was allowed to stand for 10 hours, and 250 solid images were further recorded. This cycle was repeated 200 times. After the cycle was repeated 200 times, a nozzle check pattern was observed, and the irregular ejection was evaluated on the basis of the following criteria.

A: The nozzle check pattern was normally recorded.
B: The nozzle check pattern had slight irregularities.
C: The nozzle check pattern had marked irregularities.

(Ejection Stability)

An ink cartridge filled with a prepared ink was installed in an ink jet recording apparatus. On recording media (plain paper, trade name "GF-500", manufactured by Canon), 10 solid images with a size of 1 inch×1 inch (a recording duty of 50%) were recorded, and then a nozzle check pattern was recorded. Next, 3,000 solid images were recorded in the same conditions as above, and then a nozzle check pattern was recorded again. The nozzle check pattern after recording of 10 solid images was compared with the nozzle check pattern after recording of 3,000 solid images, and the ejection characteristics were evaluated on the basis of the following criteria.

A: The nozzle check patterns were normally recorded after recording of 10 solid images and after recording of 3,000 solid images.
B: The nozzle check pattern was normally recorded after recording of 10 solid images, but the nozzle check pattern after recording of 3,000 solid images had a little disturbance.
C: The nozzle check patterns after recording of 10 solid images and after recording of 3,000 solid images had a marked disturbance.

TABLE 4

Evaluation results

| | | Optical density | Abrasion resistance | High-lighter resistance | Irregular ejection | Ejection stability |
|---|---|---|---|---|---|---|
| Example | 1 | A | AA | AA | A | A |
| | 2 | A | AA | AA | A | A |
| | 3 | A | AA | AA | A | A |
| | 4 | A | AA | AA | A | A |
| | 5 | A | AA | AA | A | A |
| | 6 | A | AA | AA | A | A |
| | 7 | A | A | AA | A | A |
| | 8 | A | AA | AA | B | A |
| | 9 | A | AA | AA | A | A |
| | 10 | A | AA | AA | A | A |
| | 11 | B | AA | AA | A | A |
| | 12 | A | AA | AA | B | A |
| | 13 | A | AA | AA | A | A |
| | 14 | A | AA | AA | A | A |
| | 15 | A | A | A | A | A |
| | 16 | A | AA | AA | A | A |
| | 17 | A | AA | AA | A | A |
| | 18 | A | A | A | A | A |
| | 19 | A | AA | AA | A | A |
| | 20 | A | AA | AA | A | A |
| | 21 | A | AA | AA | B | A |
| | 22 | B | AA | AA | A | A |
| | 23 | A | AA | AA | A | A |
| | 24 | A | AA | AA | A | A |
| | 25 | A | AA | AA | B | A |
| | 26 | A | AA | A | A | A |
| | 27 | A | AA | A | A | B |
| | 28 | A | AA | A | A | A |
| | 29 | A | AA | A | A | A |
| | 30 | A | AA | A | B | A |
| | 31 | A | A | A | A | A |
| | 32 | A | AA | A | A | A |
| | 33 | A | AA | A | A | A |
| | 34 | A | AA | A | A | A |
| | 35 | A | AA | A | A | A |
| | 36 | A | A | AA | A | A |
| | 37 | A | A | AA | A | B |
| | 38 | A | A | AA | A | A |
| | 39 | A | A | AA | A | A |
| | 40 | A | A | AA | B | A |
| | 41 | A | A | A | A | A |
| | 42 | A | A | AA | A | A |
| | 43 | A | A | AA | A | A |
| | 44 | A | A | AA | A | A |
| | 45 | A | A | AA | A | A |
| | 46 | B | B | A | B | B |
| | 47 | B | B | AA | B | A |
| Comparative Example | 1 | C | C | C | A | A |
| | 2 | A | C | C | A | A |
| | 3 | A | AA | AA | C | A |
| | 4 | A | AA | A | C | A |
| | 5 | A | A | AA | C | A |
| | 6 | A | AA | AA | C | A |
| | 7 | A | AA | A | C | A |
| | 8 | A | A | AA | C | A |
| | 9 | C | AA | AA | A | A |
| | 10 | C | A | B | A | A |
| | 11 | C | A | AA | A | A |
| | 12 | A | A | A | C | A |
| | 13 | A | A | A | C | A |
| | 14 | A | A | A | C | A |
| | 15 | C | A | A | C | A |
| | 16 | C | C | C | A | A |
| | 17 | A | A | A | C | A |
| | 18 | A | A | A | C | A |
| | 19 | A | A | A | C | A |
| | 20 | A | A | A | C | A |
| Reference Example | 1 | C | C | C | A | A |
| | 2 | A | C | C | A | A |
| | 3 | A | AA | AA | C | A |
| | 4 | C | AA | AA | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045717, filed Mar. 10, 2017, which is hereby incorporated by reference herein in its entirety.

What is claimed is:

1. An aqueous ink for ink jet, the aqueous ink comprising:
a pigment;
a resin having an anionic group;
a salt; and
a water-soluble organic solvent,
wherein the pigment is a self-dispersible pigment in which an anionic group is bonded to a particle surface of carbon black directly or through another atomic group,
wherein the resin has a weight-average molecular weight of 8,000 or more to 20,000 or less,
wherein the salt is a salt formed by bonding at least one cation selected from the group consisting of an alkali metal ion, an ammonium ion, and an organic ammonium ion with at least one anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$,
wherein the water-soluble organic solvent includes glycerol and an additional solvent other than the glycerol, and
wherein a content (% by mass) of the additional solvent relative to a content (% by mass) of the glycerol in terms of mass ratio is 0.6 times or less.

2. The aqueous ink according to claim 1, wherein the additional solvent has a dielectric constant of 28.0 or less.

3. The aqueous ink according to claim 1, wherein the content (% by mass) of the glycerol relative to a content (% by mass) of the self-dispersible pigment in terms of mass ratio is 4.5 times or more to 6.0 times or less.

4. The aqueous ink according to claim 1, wherein a content (% by mass) of the self-dispersible pigment relative to a content (% by mass) of the resin in terms of mass ratio is 2.5 times or more to 4.0 times or less.

5. The aqueous ink according to claim 1, wherein the resin has an acid value of 60 mgKOH/g or more to 130 mgKOH/g or less.

6. An ink cartridge comprising:
an ink; and
an ink storage portion storing the ink,
wherein the ink comprises the aqueous ink according to claim 1.

7. An ink jet recording method comprising:
ejecting an ink from an ink jet recording head to record an image on a recording medium,
wherein the ink comprises the aqueous ink according to claim 1.

8. The aqueous ink according to claim 1, wherein the pigment is a self-dispersible pigment in which a carboxylic acid group is bonded to a particle surface of carbon black through another atomic group.

9. The aqueous ink according to claim 1, wherein the content (% by mass) of the self-dispersible pigment is 2.00% by mass or more to 4.00% by mass or less based on the total mass of the ink.

10. The aqueous ink according to claim 1, wherein the resin having the anionic group comprises at least one of an acrylic resin and a urethane resin.

11. The aqueous ink according to claim 1, wherein the content (% by mass) of the resin is 0.50% by mass or more to 1.60% by mass or less based on the total mass of the ink.

12. The aqueous ink according to claim 1, wherein the salt comprises at least one selected from the group consisting of potassium chloride, sodium acetate, sodium benzoate, potassium benzoate, ammonium benzoate, trisodium citrate, potassium phthalate, and ammonium phthalate.

13. The aqueous ink according to claim 1, wherein the content (% by mass) of the salt is 0.20% by mass or more to 0.50% by mass or less based on the total mass of the ink.

14. The aqueous ink according to claim 1, wherein the content (% by mass) of the glycerol is 10.00% by mass or more to 20.00% by mass or less based on the total mass of the ink.

15. The aqueous ink according to claim 1, wherein the content (% by mass) of the water-soluble organic solvent is 3.00% by mass or more to 50.00% by mass or less based on the total mass of the ink.

\* \* \* \* \*